(12) United States Patent
Zhou et al.

(10) Patent No.: US 9,389,668 B2
(45) Date of Patent: Jul. 12, 2016

(54) POWER OPTIMIZATION FOR DISTRIBUTED COMPUTING SYSTEM

(71) Applicant: Intel Corporation, Santa Clara, CA (US)

(72) Inventors: Xiaohu Zhou, Shanghai (CN); Kevin Y. Li, Shanghai (CN); Rahul Khanna, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,222

(22) PCT Filed: Dec. 28, 2012

(86) PCT No.: PCT/CN2012/087820
§ 371 (c)(1),
(2) Date: Dec. 18, 2013

(87) PCT Pub. No.: WO2014/101093
PCT Pub. Date: Jul. 3, 2014

(65) Prior Publication Data
US 2015/0301572 A1    Oct. 22, 2015

(51) Int. Cl.
*G06F 9/46* (2006.01)
*G06F 1/32* (2006.01)
*G06F 9/48* (2006.01)

(52) U.S. Cl.
CPC ............ *G06F 1/3203* (2013.01); *G06F 1/329* (2013.01); *G06F 9/4893* (2013.01)

(58) Field of Classification Search
CPC .................................. G06F 9/505; G06F 9/52
USPC ................................................. 718/105, 106
See application file for complete search history.

(56) References Cited

U.S. PATENT DOCUMENTS 8,041,970 B2 * 10/2011 Oh ..................... G06F 9/5094
                                                                    713/320
2008/0046895 A1    2/2008 Dillenberger et al.
2009/0158074 A1    6/2009 Oh et al.
(Continued)

FOREIGN PATENT DOCUMENTS

EP           1958081          8/2008

OTHER PUBLICATIONS

Patent Cooperation Treaty, Notification of Transmittal of the International Search Report and the Written Opinion of the International Searching Authority mailed Oct. 24, 2013, for international application No. PCT/CN2012/087820.

*Primary Examiner* — Andy Ho
(74) *Attorney, Agent, or Firm* — Trop, Pruner & Hu, P.C.

(57) ABSTRACT

An embodiment includes determining a first power metric (e.g., memory module temperature) corresponding to a group of computing nodes that includes first and second computing nodes; and distributing a computing task to a third computing node (e.g., load balancing) in response to the determined first power metric; wherein the third computing node is located remotely from the first and second computing nodes. The first power metric may be specific to the group of computing nodes and is not specific to either of the first and second computing nodes. Such an embodiment may leverage knowledge of computing node group behavior, such as power consumption, to more efficiently manage power consumption in computing node groups. This "power tuning" may rely on data taken at the "silicon level" (e.g., an individual computing node such as a server) and/or a large group level (e.g., data center). Other embodiments are described herein.

20 Claims, 8 Drawing Sheets

(56) References Cited

U.S. PATENT DOCUMENTS

| | | | |
|---|---|---|---|
| 2010/0223618 A1 | 9/2010 | Fu et al. | |
| 2011/0078467 A1* | 3/2011 | Hildebrand | G06F 1/3203 713/310 |
| 2011/0106935 A1* | 5/2011 | Srinivasan | G06F 1/3209 709/224 |
| 2012/0137172 A1* | 5/2012 | Gardelegen | G06F 1/3206 714/14 |
| 2012/0209901 A1* | 8/2012 | Xu | G06F 9/505 709/201 |
| 2013/0097276 A1* | 4/2013 | Sridhar | G06F 9/5072 709/217 |

* cited by examiner

POWER OPTIMIZATION FOR DISTRIBUTED COMPUTING SYSTEM

BACKGROUND

Power efficiency is important for operators of single computing nodes (e.g., cell phones, Smartphones, tablets, Ultrabooks®, notebooks, laptops, desktops, servers) as well as operators of computing node groups (e.g., datacenters, cloud computing operations, and/or computing cluster operations comprising large numbers of computing nodes such as servers). Conventional power efficiency monitoring systems focus at a "low level", such as the computing load experienced by individual cores of a single processor included in a server.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

Embodiments include systems that leverage knowledge of computing node group behavior, such as power consumption, to refine computing strategies. For example, based on computing node group behavior (as opposed to single computing node behavior) an embodiment may determine to send (e.g., redirect or load balance) computing tasks to specific computing nodes included in a network of computing nodes (but not to other computing nodes in the network) to efficiently utilize the available computing resources. This may entail "power tuning" that relies on data taken at the "silicon level" (e.g., an individual computing node such as a server) and/or at the large group level (e.g., data center). The power tuning may involve distributing power consumption among several computing nodes via, for example, computer load balancing.

An embodiment includes an analytic cloud based module (often referred to herein as "analytic cloud module" or "cloud module") in which operations data (e.g., power efficiency, computation load distribution and/or concentration, and the like) of computing nodes (e.g., servers in a datacenter) are profiled and stored. Based on the operations data the cloud module may build a power or operations optimization scheme and provide related feedback to computing nodes (e.g., servers, tablets, mobile computing units). This optimization may concern load balancing but is not limited solely thereto. A user may view a particular node's power consumption history, peak power consumption, data transfer rates, and the like via a graphical user interface (GUI). The user may then compare a particular node's power efficiency to industry data gathered from historical metrics for other similar nodes.

To optimize power efficiency for server racks, a datacenter, multiple datacenters, and the like an embodiment keeps track of key aspects of an individual node's power behavior data. This data is collected and stored. The data may be collected "continuously" and/or over long periods of time to build a dataset that may be analyzed to determine power consumption patterns for individual computing nodes as well as more "macro" views of larger computing node groups. The dataset may then be examined (e.g., "mined") to find patterns/relationships that may be used to foster power efficiency optimization.

An embodiment profiles power data, analyzes that data to obtain power metrics (unit of measurement), and then optimizes power consumption for one or many computing nodes based on those metrics. The computing nodes may be widely dispersed over large distances but managed via a cloud module that handles any or all of the profiling, analyzing, and optimizing described herein.

An embodiment includes a telemetry system that may or may not couple to an analytic cloud module. For example, FIG. 1 includes data centers 101, 102, 103 that respectively include computing node groups 105, 106, 107. A data center may include a small or large number of computing nodes, such as 1, 10, 20, 30 or more computing nodes (e.g., servers). Accordingly, computing node groups 105, 106, 107 may include a single computing node (e.g., server, Smartphone, tablet), a large group of computing nodes (e.g., 20 or more servers), or some other amount larger or smaller than the groups discussed above.

Figure 1:
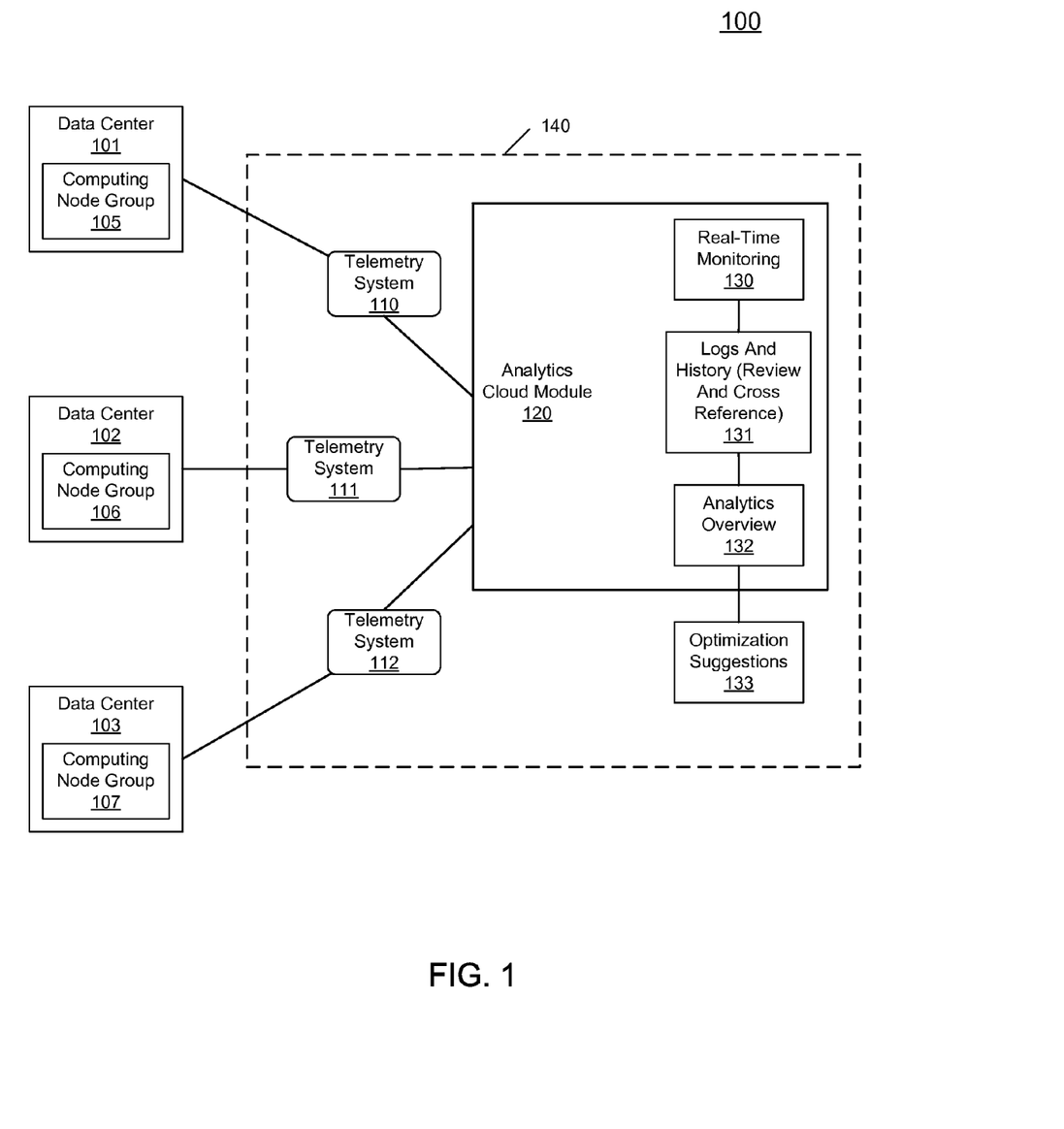
FIG. 1 depicts an embodiment of the invention comprising a telemetry system and an analytics cloud module.

Data centers 101, 102, 103 respectively couple to analytics cloud module 102 via telemetry systems 110, 111, 112. Analytics cloud module 120 analyzes input from telemetry systems 110, 111, 112. Analytics cloud module 120 may include various modules such as real time monitoring module 130, which provides real time monitoring of systems 101, 102, 103. Analytics cloud module 120 may include history module 131, which logs performance for systems 101, 102, 103 and may include historical information gathered from systems 101, 102, 103 and/or other systems that may or may not be actively networked with systems 101, 102, 103. Analytics cloud module 120 may include analytics overview module 132, which may gather input from modules 130 and/or 131 and provide output, such as optimization suggestions 133 (e.g., computer instructions or commands regarding load balancing or system configuration), to systems such as systems 101, 102, 103 and/or other systems.

A connection infrastructure between components of FIG. 1 (e.g., between data center 101 and cloud module 120) may be based on, for example, a TCP/IP network, corporate internal network, public Internet, and the like.

Figure 2:
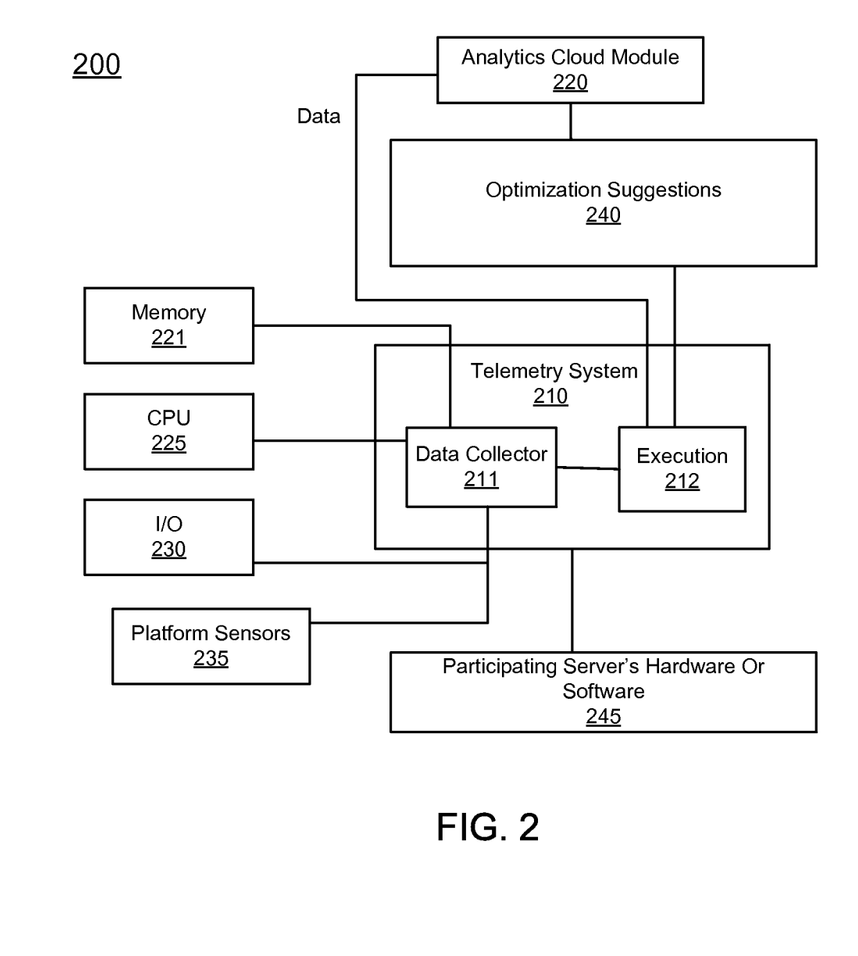
FIG. 2 depicts an embodiment of the invention comprising a telemetry system.

FIG. 2 depicts an embodiment of the invention comprising a telemetry system. Telemetry system may be embodied in, for example, system 600 of FIG. 6 (discussed below). Telemetry system 210 may retrieve data, such as power behavior data, from various components of a computing node. For example, telemetry system 210 may receive data concerning temperature, cache misses, and/or channel accesses from memory 221. Telemetry system 210 may receive data concerning temperature, translation lookaside buffer (TLB) misses, and/or instructions or operations performed from processor 225. Telemetry system 210 may receive data concerning interrupts, device accesses, data transfer rates, and/or response rates from input/output (I/O) bus 230.

Telemetry system 210 may receive data concerning, for example, temperature, current drawn, and/or voltage levels from platform sensors 235. In one embodiment telemetry system 200 may capture telemetry data from a distributed set of physical and logical sensors included in sensors 235. Physical sensors include distributed temperature sensors (e.g., thermistors), voltage meters (e.g., voltmeters), current meters (e.g., ammeters and microammeters), reliability indicators (e.g., counters for TLB misses), operations counters, revolutions per second/minute. Logical sensors include operating system metrics and quality of service (QOS) metrics such as, for example, data transfer rate, error rate, service response time, signal-to-noise ratio, and frequency response.

Telemetry system 210 may store the collected data in "data collector" memory 211. Execution module 212 may include control logic for processing the data stored in memory 211. Execution module 212, which may include control logic discussed in more depth with regard to FIG. 6, may provide real-time monitoring values, data logs, historical trends, and/or comparisons between real time data and historical data from components 221, 225, 230, 235 or other components from other computing nodes or computing node groups. However, in another embodiment execution module 212 may provide raw data to analytics cloud module 220 that then provides real-time monitoring values, data logs, historical trends, and/or comparisons between real time data and historical data from components 221, 225, 230, 235 or other components from other computing nodes or computing node groups. Analytics cloud module 220 may take this data and provide optimization suggestions 240 to telemetry system 210. Such suggestions may be to shift computing jobs from one server in a group of computing nodes to another server in that same group of computing nodes or in another group of computing nodes. These suggestions, which may be made in the form of computer instructions, may be passed to computing node hardware and/or software 245 separate from components 221, 225, 230, 235 and/or to components 221, 225, 230, 235 for implementation and/or consideration.

Telemetry system 200 may retrieve (actively or passively) data from one or more computing nodes which can include a single server, server racks, or groups of servers. Specifically, telemetry system 200 may passively receive data from components 221, 225, 230, 235 or, for example, poll components 221, 225, 230, 235 for this information.

Multiple telemetry systems may be needed to track multiple computing nodes, such as systems 110, 111, 112 included between data centers 101, 102, 103 and cloud module 120 in FIG. 1. However, physical location and distribution is variable. A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. Modules may be included on the same wafer, substrate, chipset, or distributed across several substrates, packages across short or long distances. Thus, systems 110, 111, 112 may be separate from another and respectively located in data centers 101, 102, 103 that are they themselves remotely located from one another. However systems 110, 111, 112 may be separate from another and respectively between data centers 101, 102, 103 (but not located in data centers 101, 102, 103) and cloud module 120. Systems 110, 111, 112 may be separate from another and respectively included in cloud module 120 (see dashed block 140 including components 110, 111, 112, 120). In still other embodiments systems 110, 111, 112 may be included in a single package, used common hardware and software, and be included in any of cloud module 120, data centers 101, 102, 103, or any point in between or coupled thereto. Cloud module 120 itself may be located within one of data centers 101, 102, 103 or any of computing nodes included in groups 105, 106, 107.

Figure 3:
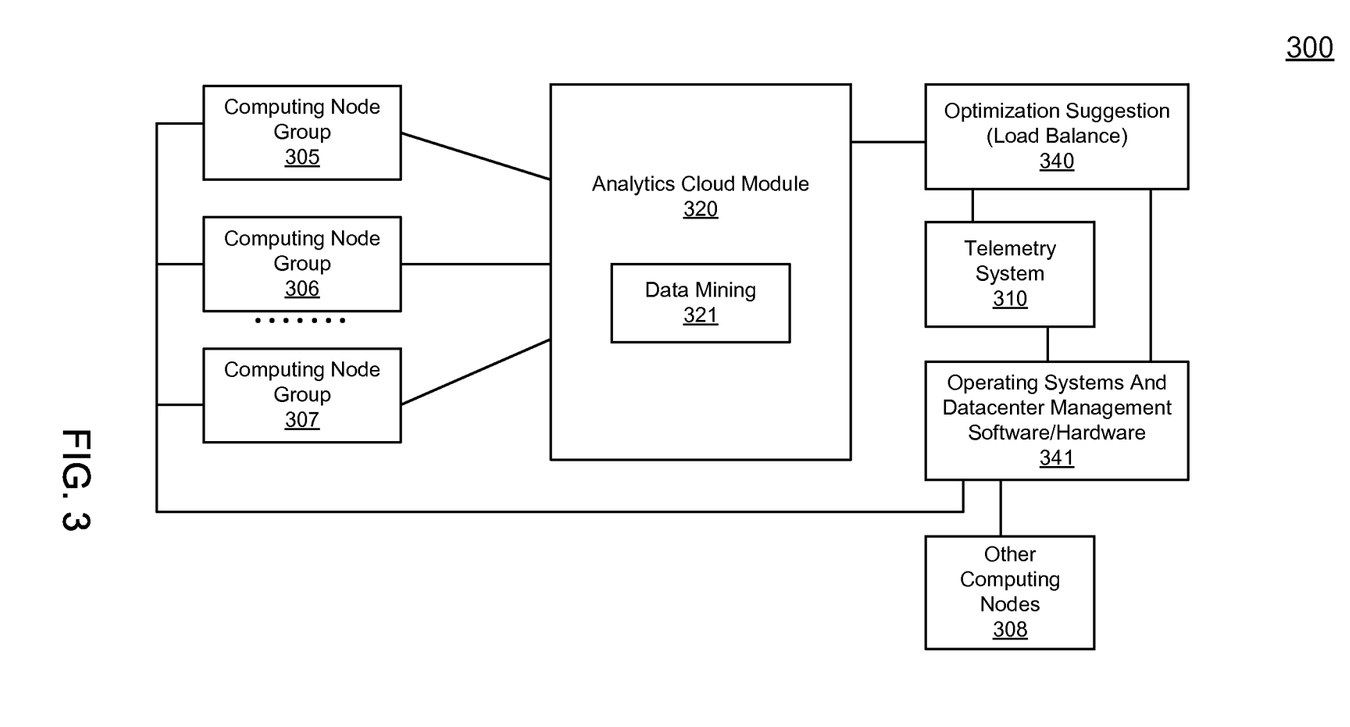
FIG. 3 depicts an embodiment of the invention comprising an analytics cloud module.

FIG. 3 depicts an embodiment of the invention comprising an analytics cloud module. Analytics cloud module 320 couples directly or indirectly (e.g., via a telemetry system) to computer node groups 305, 306, 307, which may provide, for example, metrics such as processor and memory temperatures, I/O traffic, TLB misses, and the like to cloud module 320. Computing node group 305, for example, may include a single computing node or many computing nodes. In an embodiment analytics cloud module 320 may store, track, and analyze this data received directly from computer node groups 305, 306, 307 or indirectly from computer node groups 305, 306, 307 via telemetry system. This data may be specific to one computing node or a more generally concerned with multiple computing nodes (e.g., average current being drawn by memory modules located throughout a group of computing nodes).

As mentioned above, cloud module 320 may provide optimization suggestions (e.g., commands) 340 (e.g., regarding load balancing) to telemetry systems 310 and/or operating systems (OS) and datacenter management hardware and/or software 341. Telemetry systems may function as agents to set the software and/or hardware of computing nodes to optimize power efficiency in light of suggestions 340. The suggestions may then be communicated to computing node groups 305, 306, 307 and even computing node group 308, which does not provide data to could module 321.

An embodiment of the invention aggregates power behavior data from participating computing nodes, such as servers, regardless of the software the nodes run. For example, the data may be provided for temperature in a generic communication package with a header indicating the source and a payload indicating the temperature measurement. Consequently, cloud module 320 gathers great amounts of power usage and general computing node operation data, which can then be processed via data mining module 321 (discussed further below) to analyze and find power consumption patterns of groups of servers, a datacenter, or among multiple datacenters. Thus, system 300 probes and tunes power efficiency for any single compute node as well as any computing node rack, computing node group or groups, or even a datacenter(s) as a whole object to optimize corresponding energy efficiency.

An embodiment may provide varying levels of analytical granularity. For example, a single embodiment may provide fine grained, low level, silicon power behaviors such as, for example, read, write, and activate counts for a single memory module of a single computing node. This kind of detailed data may be delivered to the power analytics cloud module 320. Cloud module 320 may provide a graphical user interface (GUI) dashboard from which a user can monitor real-time power behaviors, including real-time power consumption, register counters, power meter values, and the like at various granularities from a single machine (low level), an entire rack of computing nodes (middle level), and/or a portion or the entirety of machines in one or more datacenters (high level). Cloud module 320 may store power usage history of every single computing node it monitors and also provide a visual representation of the usage to help a user review power data for selected computing nodes in varying time ranges and the like. Thus, an embodiment allows users to view things from "low level" (e.g., an individual server) to "high level" (e.g., a datacenter).

Data mining module 321 may allow an embodiment using known data mining techniques to determine relationships such as times of day when a particular node is less productive (e.g., possibly correlating a time of year and time of day when the atmospheric environment is warm and adversely affects the efficiency of the node in question). Data mining module 321 may monitor a single participating node to gain a large amount of aggregated power behavior data for that node (and for many other nodes that module 321 monitors) to generate historical profiles for the nodes module 321 monitors. These profiles may show the average temperature for a certain processor is X, which is much higher than suggested by the processor's manufacture. With this accumulated data, cloud module 120 may determine a specific processor is running a too high a temperature as compared to X, and subsequently to shunt computer loads away from that processor and towards other computing resources.

Cloud module 120 may provide intelligence such as, for example, how well a datacenter's overall power efficiency is compared with industry standards (e.g., a standard not specific to groups 305, 306, 307) or historical data gathered by or imported by cloud module 120 (which is specific to groups 305, 306, 307 or at least is based on groups 305, 306, 307 in addition to other groups). Cloud module 120 may thus be able to analyze, for example, power consumption history, peak power values, peak power consumption times, which servers are bottlenecks (e.g., provide subpar data rate transmission), and at which times those bottlenecks occur.

Figure 4:
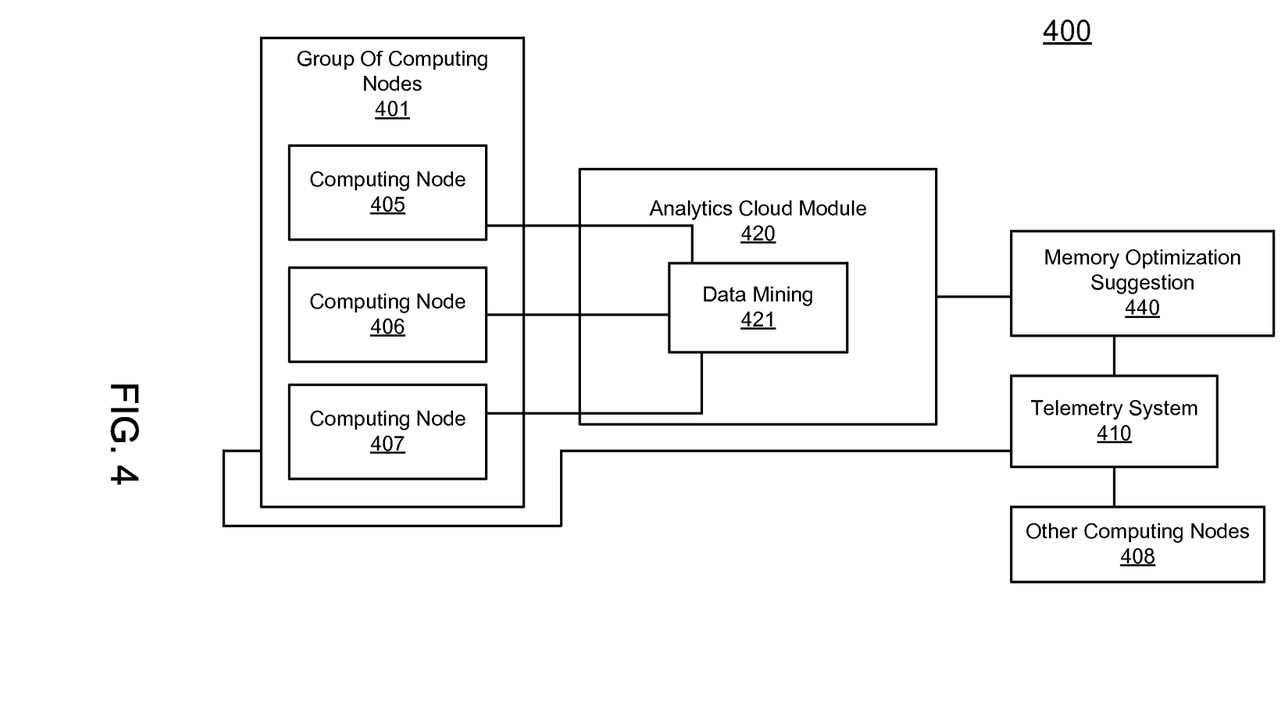
FIG. 4 depicts an embodiment of the invention comprising an analytics cloud module.

FIG. 4 depicts an embodiment of the invention comprising an analytics cloud module. FIG. 4 concerns group of computing nodes 401 and, consequently, is at a level of granularity higher than FIG. 2 (pertaining to a single computing node) and lower than FIG. 3 (pertaining to several groups of computing nodes). System 400 includes cloud module 420, comprising data mining module 421, that couples to computing nodes 405, 406, 407 (e.g., servers) and provides memory optimization suggestions/commands 440 to telemetry system(s) 410, which is then communicated to group 401 and/or another computing node 408. Telemetry system may be located as shown in FIG. 4 or between any of nodes 405, 406, 407 and cloud 410.

In an embodiment computing nodes 405, 406, 407 each provide memory access data, memory power consumption data, and the like to cloud module 420, which is then able to optimize memory power consumption and overall memory performance by analyzing memory access patterns and power consumption data. The large scale of data from participating servers enables the power analytics cloud module to build schemes and find correlation among memory configurations, access patterns, and power consumption to provide optimization suggestions (e.g., determining which memory management schemes work best for certain types of computer loads). Optimization suggestions may then be sent to telemetry system 410, which configures server node 405, 406, and/or 407 hardware and/or software accordingly.

Figure 5:
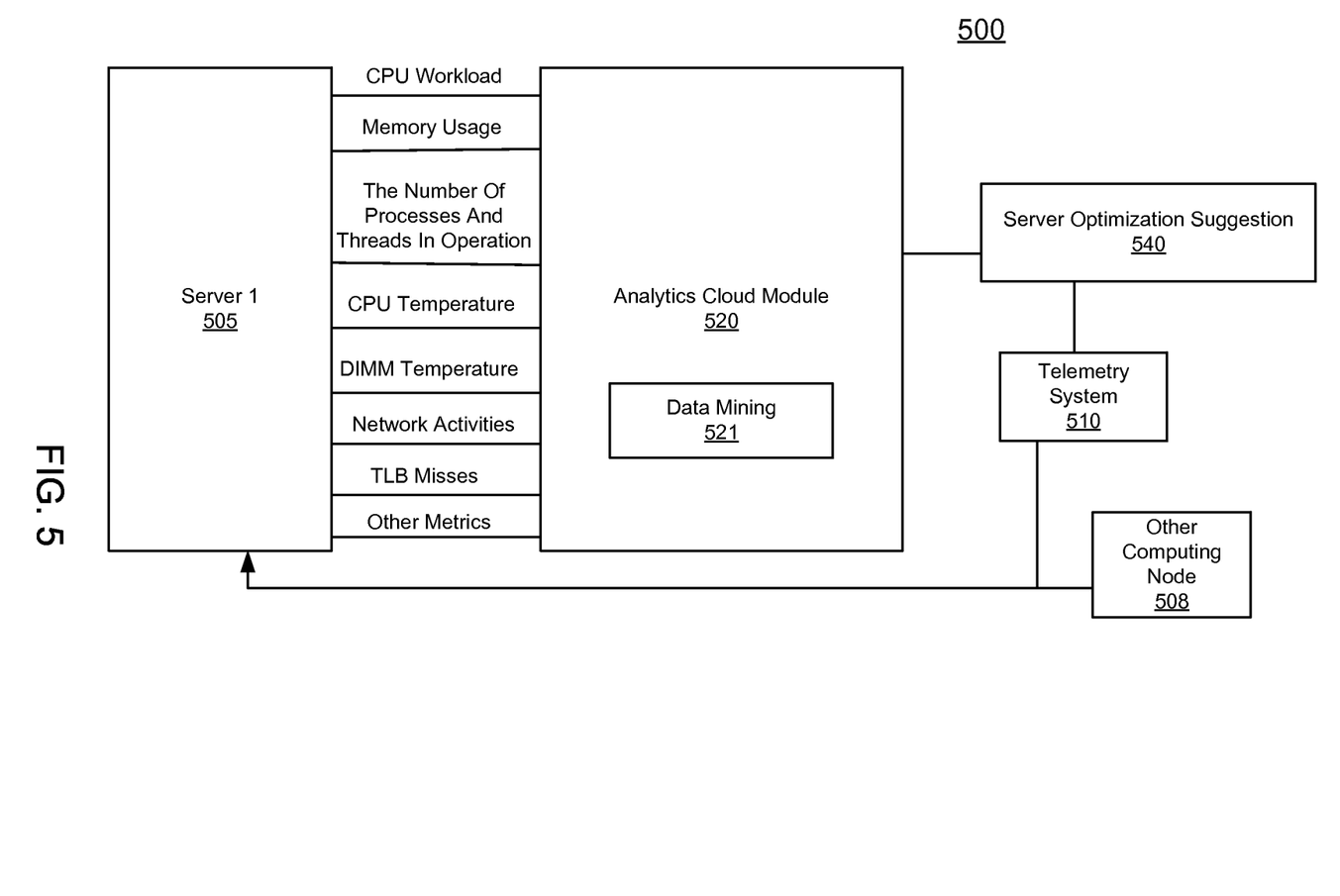
FIG. 5 depicts an embodiment of the invention comprising an analytics cloud module.

FIG. 5 depicts an embodiment of the invention comprising an analytics cloud module. FIG. 5 is similar to FIG. 2 in terms of granularity in that FIG. 5, like FIG. 2, concerns low level analysis of a single computing node such as, for example, a server. System 500 includes cloud module 520, comprising data mining module 521, which couples to server 505 and provides power optimization suggestions/commands 540 to telemetry system(s) 510. Telemetry system 510 may be located in between server 505 and cloud module 520 in an embodiment. Cloud module 521 provides optimization suggestions for server 505 and/or another computing node 508 by correlating various logical and/or physical metrics from the server. Logical metrics include, for example, memory usage, processor usage/workload, the number of processes enacted, and the number of threads executed. Physical metrics include, for example, temperature for a processor, temperature for a memory or any other component, data transfer rate for network activities, TLB misses and the like. This process may be implemented on the remaining compute nodes (not shown in FIG. 5) engaged with cloud module 520.

Figure 6:
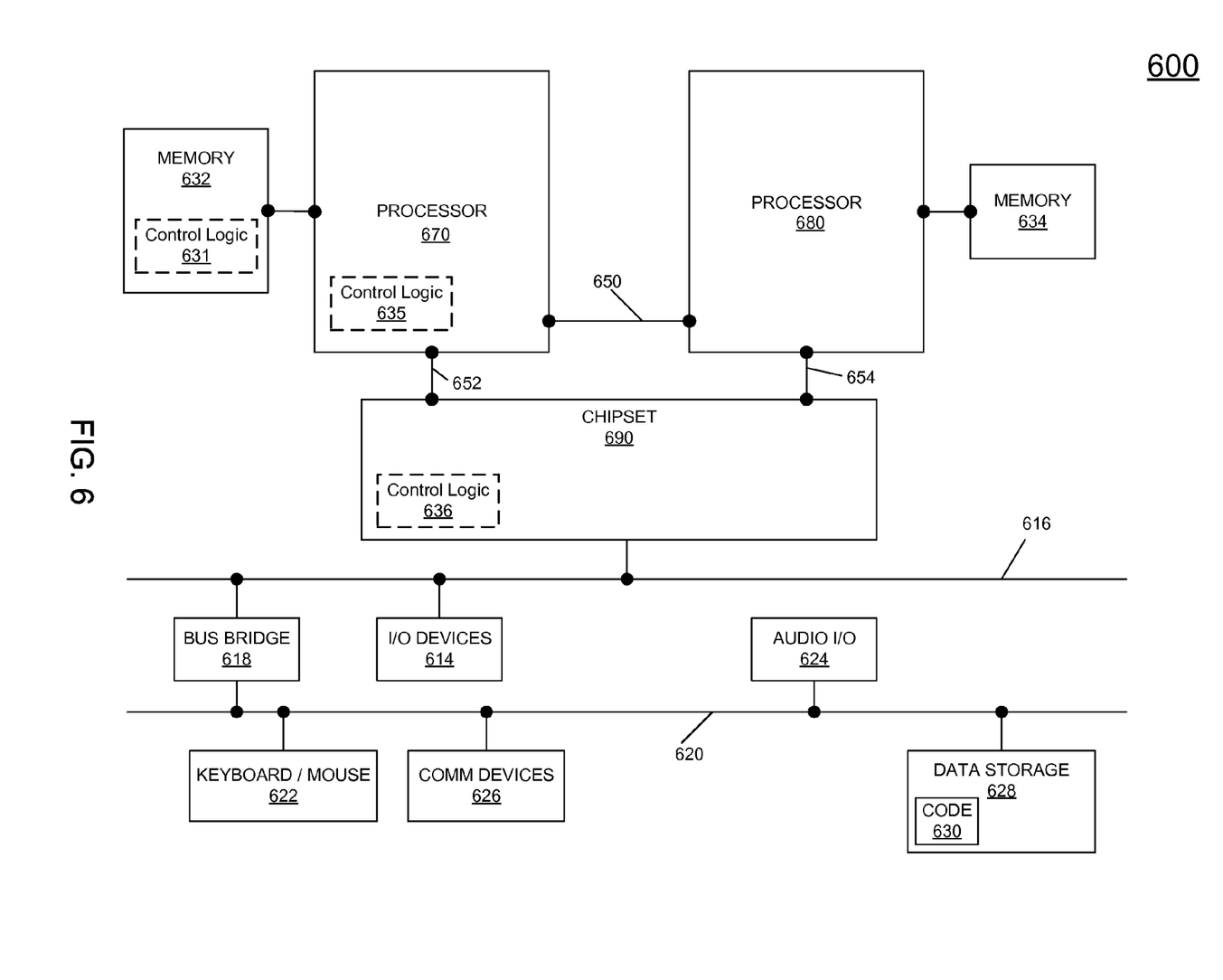
FIG. 6 depicts a system for use with embodiments of the invention.

Embodiments may be implemented in many different system types. Referring now to FIG. 6, shown is a block diagram of a system in accordance with an embodiment of the present invention. System 600 may be used to implement, for example, telemetry system 110, analytics cloud module 120, datacenter 101, any server in server group 105, or any computing node (e.g., laptop, cell phone, Smartphone, mobile computing node, Ultrabook®, desktop, notebook, personal digital assistant) that is to be analyzed and/or managed via cloud module 120. Multiprocessor system 600 is a point-to-point interconnect system, and includes a first processor 670 and a second processor 680 coupled via a point-to-point interconnect 650. Each of processors 670 and 680 may be multi-core processors. The term "processor" may refer to any device or portion of a device that processes electronic data from registers and/or memory to transform that electronic data into other electronic data that may be stored in registers and/or memory. First processor 670 may include a memory controller hub (MCH) and point-to-point (P-P) interfaces. Similarly, second processor 680 may include a MCH and P-P interfaces. The MCHs may couple the processors to respective memories, namely memory 632 and memory 634, which may be portions of main memory (e.g., a dynamic random access memory (DRAM)) locally attached to the respective processors. First processor 670 and second processor 680 may be coupled to a chipset 690 via P-P interconnects, respectively. Chipset 690 may include P-P interfaces. Furthermore, chipset 690 may be coupled to a first bus 616 via an interface. Various I/O devices 614 may be coupled to first bus 616, along with a bus bridge 618, which couples first bus 616 to a second bus 620. Various devices may be coupled to second bus 620 including, for example, a keyboard/mouse 622, communication devices 626, and data storage unit 628 such as a disk drive or other mass storage device, which may include code 630, in one embodiment. Code may be included in one or more memories including memory 628, 632, 634, memory coupled to system 600 via a network, and the like. Further, an audio I/O 624 may be coupled to second bus 620.

Embodiments may be implemented in code and may be stored on storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. In one embodiment, use of the term control logic includes hardware, such as transistors, registers, or other hardware, such as programmable logic devices (635). However, in another embodiment, logic includes software or code (631). Such logic may be integrated with hardware, such as firmware or micro-code (636). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

Figure 7:
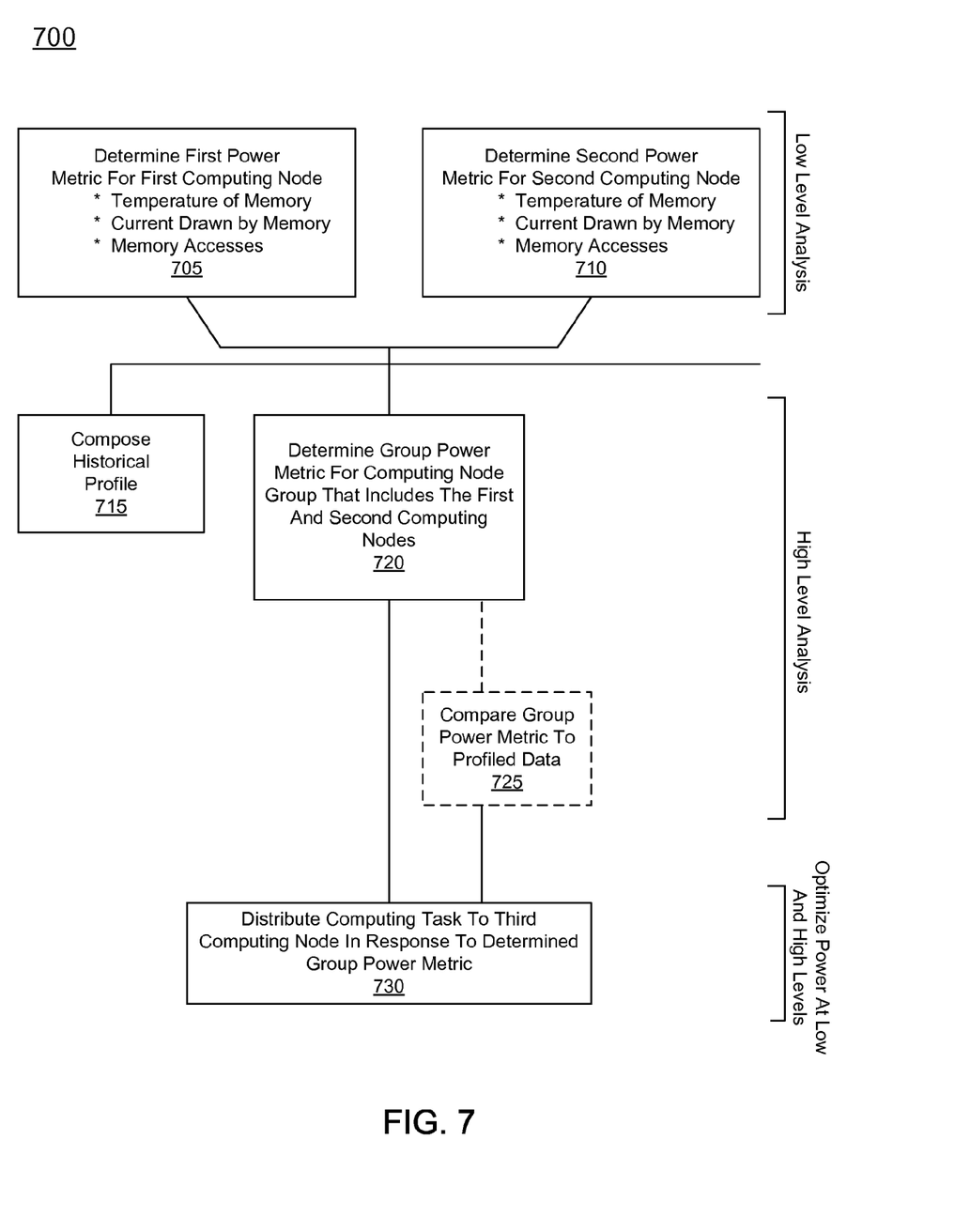
FIG. 7 includes a method in an embodiment of the invention.

FIG. 7 includes a method in an embodiment of the invention. Block 705 includes determining a first power metric specific to a first computing node but not a second computing node. Block 710 includes determining a second power metric specific to a second computing node but not the first computing node. The first and second power metrics may correspond to one or more of, for example, temperature, voltage, current, executed instruction count, memory accesses, write counts, read counts, QOS, cache misses, data transfer rate, error rate, service response time, signal-to-noise ratio, frequency response, and the like. The first and second power metrics may correspond to different instances of the same metric (e.g., both correspond to current drawn by memory included respectively in the first and second computing nodes) or may address different metrics (e.g., the first metric may correspond to the temperature of memory in the first computing node and the second metric may correspond to current drawn by memory in the second computing node). This may constitute "low level" or low granular analysis because it concerns a specific computing node or portion of a computing node. In one embodiment a cloud analytic module may determine first and second power metrics by simply receiving these values from remotely located first and second computing nodes (or telemetry systems corresponding to those nodes). In other embodiments determining the value may comprise the cloud module actually calculating the value (e.g., determine a current level based on, for example, resistance data communicated to the cloud module).

In block 720 a cloud module may determine a group power metric corresponding to a group of computing nodes that includes the first and second computing nodes. For example, both the first and second computing nodes may be included in a single server rack. Each computing node, which may be servers in this example, has a memory. The first and second power metrics may each comprise average memory accesses/minute for first and second memories included in one or more servers in the rack. The group power metric may include an average memory access/minute that is based on both of these values. Thus, the group metric is based on the low granular first and second metrics but is not specific to either first or second computing nodes. The group metric has a high granularity of analysis than any one specific node.

Block 725 is optional and is shown in dashed lines to convey its optional nature. In block 725 the analytic cloud module may compare the group power metric to profile data. For example, profile data may include an average current level that should be drawn for a memory module(s) experiencing a certain number of accesses/minute. This profile data may be received by the analytic cloud module from a remote database. However, the analytic cloud module may instead determine the profile data based on its historical accumulation of data from the first and second computing nodes and/or other computing nodes that may or may not be included in the same group (e.g., datacenter or cluster) as the first and second computing nodes. The group power metric may include, for example, average current level being drawn by memory modules in first and second computing nodes.

Block 730 may include distributing a computing task to a third computing node, and not the first or second computing nodes, in response to the determined group power metric. This may entail, for example, load balancing. For example, upon determining the average current being drawn for the computing group exceeds the profile value by more than x % (e.g., 15%) and the current average is maintained for more than y minutes (e.g., 5 minutes), the analytic cloud module may shift computing workload from the first computing node to the third computing node in response to determining the first power metric and/or the group power metric. The workload (e.g., an instruction) may have been originally intended for the first computing node (e.g., based on a central controller decision, standing instructions for load distribution, and the like) but was redirected based on the analysis of the first power metric, group power metric, and the like.

Block 715 may include composing a historical profile based on data gathered from the first and/or second computing nodes. The profile may be communicated to one or more analytic cloud modules. The one or more cloud modules may then utilize the profile information to make suggestions regarding, for example, power conservation (e.g., see block 725).

A first computing node may include a first server separate from and not included in a second server that is included in the second computing node. The first and second computing nodes may be included in a computer cluster that does not include the third computing node. A computer cluster may consist of a set of loosely connected computers that work together so that in many respects they can be viewed as a single system by computing nodes included or not included in the cluster.

A process for load balancing in one embodiment of the invention is now discussed in detail. As discussed above, load balancing strategies may be determined in an analytic cloud (e.g., cloud 120) and communicated as instructions to various computing nodes (block 133). In one embodiment load balancing concerns distributing a workload across multiple compute nodes while fulfilling certain constraints that guide the scheduling or migrating of jobs or loads that collectively comprise the workload. These constraints define, partially or fully, the viable limits that guide the boundary conditions for effective operation of a computing node infrastructure (e.g., server infrastructure). For example, a workload may be placed in a specific compute node such that the workload/compute node combination fulfills service objectives (e.g., response time of a query) while minimizing the power requirements needed to fulfill the service objectives. However, identifying the proper computing node (e.g., server) or computing nodes (e.g., server rack or server cluster) among a large number of compute nodes is an "NP-complete problem" (discussed below). An embodiment uses a global optimization equation to validate the candidate solution through evaluation of the fitness of that solution.

As an aside, in computational complexity theory, NP (non-deterministic polynomial time) is a fundamental complexity class. NP is the set of all decision problems for which the instances where the answer is "yes" have efficiently verifiable proofs of the fact that the answer is indeed "yes". More precisely, these proofs may be verifiable in polynomial time by a deterministic Turing machine. NP includes NP-complete problems for which no polynomial-time algorithms are known for solving them (although they can be verified in polynomial time).

In one embodiment $A_n$ is the average energy consumption of a node, and B is the average power consumption of a cluster of nodes. If a load distribution objective is to reduce the variance of energy allocation among nodes, while maintaining a service level objective (SLO), such as response time, and observing the power limit of a computing node group or cluster ($P_{max}$), then an embodiment may implement the following:

1. Node Fitness A (Balance):

$$F_n^A(t) = \min\left(1, \frac{|A_n(t) - B(t)|}{B(t)}\right),$$

$$F^A(t) = \frac{1}{N}\sum_{n=0}^{N} F_n^A(t)$$

2. Node Fitness B (Max Power Limit):

$$F^B(t) = \max\left(0, \frac{\left(P_{max} - \sum_{n=0}^{N} A_n(t)\right)}{P_{max}}\right)$$

3. Node Fitness C (SLO):

$$F_n^C(t) = 1.0 - \min\left(1, \frac{|R - R_n(t)|}{R}\right),$$

$$F^C(t) = \frac{1}{N}\sum_{n=0}^{N} F_n^C(t)$$

4. Total Fitness=$\alpha_1 F^A(t) + \alpha_2 F^B(t) + \alpha_3 F^C(t)$, $\alpha_1 + \alpha_2 \alpha_3 = 1.0$
5. $A(t) = f_1(U_{cpu}^1(t), U_{cpu}^2(t), \ldots, U_{cpu}^n(t), U_{mem}^1(t), U_{mem}^2(t), \ldots, U_{mem}^m(t))$
6. $R(t) = f_2(U_{cpu}^1(t), U_{cpu}^2(t), \ldots, U_{cpu}^n(t), U_{mem}^1(t), U_{mem}^2(t), \ldots, U_{mem}^m(t))$
7. $P_{max}$=Total power available to the cluster of servers.

In equations [1]-[7], an embodiment uses a fitting function that predicts the average power consumption $A_n(t)$ and response time $R_n(t)$ based on utilization of individual components in the node. Coefficients of equations are trained using a training set over a large sampling period. Once the equations are trained, an embodiment uses a machine learning technique to predict the fitness function by simulating the scenario where extra computation load (e.g., incremental increase of utilization of a computing node and/or migrated, fully or partially, from one computing node to another computing node) is applied to any number of nodes in the system of clusters.

Figure 8:
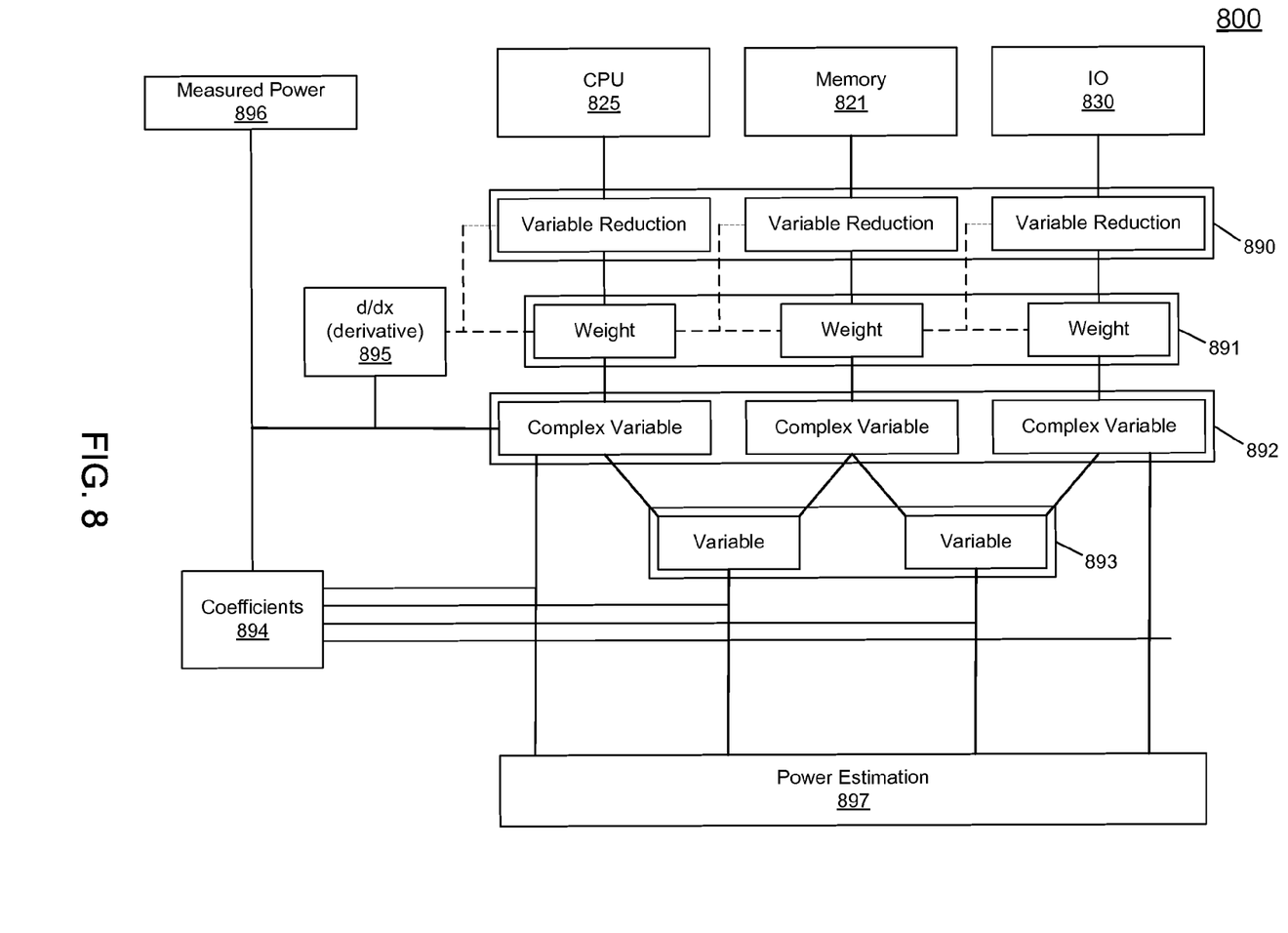
FIG. 8 includes a system for load distribution in an embodiment of the invention.

FIG. 8 includes a system for load distribution in an embodiment of the invention. CPU 825 includes data from one or more processors of one or more computing nodes (e.g., current drawn, instructions processed), memory 821 includes data from one or more memory modules of one or more computing nodes (e.g., memory accesses), and IO 830 includes data from one or more IO units of one or more computing nodes (e.g., IO traffic). IO is not represented in equations [1]-[7] above but is included in FIG. 8 to illustrate how embodiments are not restricted to any one set of data.

In block 890 these data are subjected to variance reduction. In an embodiment block 890 selects the weight for the input variables of a component (CPU 825, memory 821, IO 830, hard disc drives (HDD), and the like) after identifying those that: (1) are most correlated with the output values; (2) cause discontinuities and contribute to the threshold effects in the output values; and (3) are eliminated as they possess a high degree of linear correlation with another variable such that both influence the analyzed output variable in a very similar (if not an identical) way. Selected variables adopt the coefficients of the discarded variable.

In block 890 input sensor/performance data are subjected to variable reduction. An objective of variable reduction is to help analyze and compare the slope coefficients of a system's model where a component's input variable is regarded as the most significant, which is related to the slope coefficient of the largest absolute value. A large slope coefficient indicates high sensitivity to very small changes in the input variable that results in very large changes in the output variable. One embodiment extracts consecutive models that are created by shifting a sampling window of the data points. Each model shares the sampled data with consecutive models. This helps in converting a multidimensional nonlinear model into a series of linear models.

In block 891 weights are applied. These are the weights allocated to each variable (telemetry components, such as $U_{cpu}$, $U_{mem}$) according to the significance of that variable. These weights are not shown in equations [5] and [6] but may be added in an embodiment. The significance of the variable is estimated by evaluating the sensitivity of output based on variations in that variable. To avoid non-linearity in the training set, an embodiment evaluates the weights (sensitivity factor) by sliding the small proportion of the training data sample set by a constant number of samples (modeling window). This way the embodiment collects multiple samples and averages the weights obtained through multiple modeling windows.

Block 896 is for evaluating sensitivity of the variable for a given output. In other words, block 896 may be used as a training reference that is not needed once the model is trained. For example, block 896 may include a power-meter in the case of power estimation.

In block 892 complex variables are determined in light of block 893, where further variables are applied, along with coefficients 894 to determine a power estimation value (897). In block 892 these complex variables are the weighted sums of individual variables from the input (block 890). In functions $f_1$, $f_2$ complex variables are represented by $U_{device}$. These variables represent a reduced equation for component specific contribution to the output (power, SLO etc.).

Block 893 represents the model equation that is formed by using complex variables ($U_{device}$) in a linear or non-linear function. The model equation used in FIG. 8 is: $aX+bXY+cYZ+dZ+K=$Output [power or SLO]. This equation can also represent functions $f_1$, $f_2$ where each equation represents a complex variable Utilization ($U_{device}$).

Block 894 includes coefficients a, b, c, d, K, which are evaluated as a result of regression function (in the case of FIG. 8, a Genetic Algorithm) using the reference (measured) output given by block 896 and training data set. The training data set contains the value of complex variables X, Y, Z and measured output given by 896 for a given time period.

The power estimation value for a given model may drive suggestions (e.g., block 133 of FIG. 1) regarding which nodes to balance computing loads to (and in what proportions to given nodes). For example, the load balancing scheme with the lowest power estimation value may be implemented.

The data extracted through telemetry units (see block 896 of FIG. 8) may accomplish several tasks. First, the data may be used to correct model equations (e.g., equations [1]-[7]) if the equations produce power estimates that deviate from the expected results. An embodiment may use regression analysis (e.g., Support Vector Machine) to perform dynamic correction on the model. Second, the data may be used to recalculate the fitness function (equation [4]) as the system is a dynamic system and demonstrates a variation in demand (as determined via block 895 of FIG. 8). This may result in migration of load between a set of source/target nodes. Third, the data may be used for visualization of the power consumption, response-time, throughput, and the like. Fourth, the data may help identify the attributes of the workload so an embodiment may identify resource characteristics and behavior to aid in workload placement. These attributes may relate to, for example, phases of operations, average and peak utilization, and/or mutual compatibility with other workloads (e.g., cache thrashing, resource contention). These attributes allow an embodiment to identify compatibility with existing loads on the system as well as availability of the resources needed.

Other criteria (e.g., thermal variance, cache miss behavior) may be added to any of blocks 825, 821, 830 in addition to other blocks (environmental sensors in a data center).

An embodiment includes a method executed by at least one processor comprising: determining a first power metric corresponding to a group of computing nodes that includes first and second computing nodes; and distributing a computing task to a third computing node, and not the first or second computing nodes, in response to the determined first power metric; wherein the third computing node is located remotely from the first and second computing nodes. In an embodiment the first and second computing nodes are included in a computer cluster that does not include the third computing node. In an embodiment the first power metric is specific to the group of computing nodes and is not specific to either of the first and second computing nodes. In an embodiment the first power metric corresponds to one of temperature, voltage, current, executed instruction count, memory accesses, write counts, read counts, quality of service (QOS), cache misses, data transfer rate, error rate, service response time, signal-to-noise ratio, and frequency response. In an embodiment the first power metric includes temperature based on a temperature corresponding to the first computing node and another temperature corresponding to the second computing node. In an embodiment the first power metric is based on both (a) a power metric specific to the first computing node but not the second computing node, and (b) an additional power metric specific to the second computing node but not the first computing node. An embodiment includes: receiving the power metric specific to the first computing node from the first computing node; and receiving the power metric specific to the second computing node from the second computing node. An embodiment includes shifting computing workload from the first computing node to the third computing node in response to determining the power metric specific to the first computing node. An embodiment includes determining a historical power metric non-specific to the group of computing nodes; analyzing the first power metric based on the historical power metric; and distributing the computing task to the third computing node in response to analyzing the first power metric based on the historical power metric. An embodiment includes determining a historical power metric non-specific to the group of computing nodes based on the first power metric. In an embodiment the historical power metric is based on power metric data from each of the first, second, and third computing nodes. In an embodiment distributing the computing task to the third computing node, and not the first or second computing nodes, includes load balancing computing tasks between the first, second, and third computing nodes in response to the determined first power metric. In an embodiment the first computing node includes a first server separate from and not included in a second server that is included in the second computing node. An embodiment includes shifting computing workload from one of the first and second computing nodes to the third computing node in response to the determined first power metric; wherein shifting the computing workload includes distributing the computing task to the third computing node. An embodiment includes analyzing the first power metric based on a historical power metric non-specific to the group of computing nodes; and distributing the computing task to the third computing node in response to analyzing the first power metric based on the historical power metric.

An embodiment includes an apparatus comprising: at least one memory; and at least one processor, coupled to the memory, to perform operations comprising: determining a first power metric corresponding to a group of computing nodes that includes first and second computing nodes; and distributing a computing task to a third computing node, and not the first or second computing nodes, in response to the determined first power metric; wherein the third computing node is located remotely from the first and second computing nodes. In an embodiment the computing task is destined for the first computing node but is rerouted to the third computing node in response to the determined first power metric. In an embodiment the first power metric is specific to the group of computing nodes and is not specific to either of the first and second computing nodes.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one storage medium having instructions stored thereon for causing a system to:

determine a first power metric corresponding to a group of computing nodes that includes first and second computing nodes; and distribute a computing task to a third computing node, and not the first or second computing nodes, in response to the determined first power metric;

wherein (a) the first power metric is specific to the group of computing nodes and is not specific to either of the first and second computing nodes; and (b) the first computing node includes a first server separate from and not included in a second server that is included in the second computing node.

2. The at least one storage medium of claim 1, wherein the first and second computing nodes are included in a computer cluster that does not include the third computing node.

3. The at least one storage medium of claim 1, wherein the first power metric corresponds to one of temperature, voltage, current, executed instruction count, memory accesses, write counts, read counts, quality of service (QOS), cache misses, data transfer rate, error rate, service response time, signal-to-noise ratio, and frequency response.

4. The at least one storage medium of claim 1, wherein the first power metric includes temperature based on a temperature corresponding to the first computing node and another temperature corresponding to the second computing node.

5. The at least one storage medium of claim 1, wherein the first power metric is based on both (a) a power metric specific to the first computing node but not the second computing node, and (b) an additional power metric specific to the second computing node but not the first computing node.

6. The at least one storage medium of claim 5 including instructions to:

receive the power metric specific to the first computing node from the first computing node; and receive the power metric specific to the second computing node from the second computing node.

7. The at least one storage medium of claim 6 comprising instructions to shift computing workload from the first computing node to the third computing node in response to determining the power metric specific to the first computing node.

8. The at least one storage medium of claim 1 comprising instructions to:

determine a historical power metric non-specific to the group of computing nodes;

analyze the first power metric based on the historical power metric; and distribute the computing task to the third computing node in response to analyzing the first power metric based on the historical power metric.

9. The at least one storage medium of claim 1 comprising instructions to determine a historical power metric non-specific to the group of computing nodes based on the first power metric.

10. The at least one storage medium of claim 9 wherein the historical power metric is based on power metric data from each of the first, second, and third computing nodes.

11. The at least one storage medium of claim 1, wherein distributing the computing task to the third computing node, and not the first or second computing nodes, includes load balancing computing tasks between the first, second, and third computing nodes in response to the determined first power metric.

12. The at least one storage medium of claim 1 including instructions to shift computing workload from one of the first and second computing nodes to the third computing node in response to the determined first power metric; wherein shifting the computing workload includes distributing the computing task to the third computing node.

13. The at least one storage medium of claim 1 comprising instructions to:

analyze the first power metric based on a historical power metric non-specific to the group of computing nodes; and distribute the computing task to the third computing node in response to analyzing the first power metric based on the historical power metric.

14. An apparatus comprising:

at least one memory; and at least one processor, coupled to the memory, to perform operations comprising:

determining a first power metric corresponding to a group of computing nodes that includes first and second computing nodes; and distributing a computing task to a third computing node, and not the first or second computing nodes, in response to the determined first power metric;

wherein (a) the first power metric is specific to the group of computing nodes and is not specific to either of the first and second computing nodes; and (b) distributing the computing task to the third computing node, and not the first or second computing nodes, includes load balancing computing tasks between the first, second, and third computing nodes in response to the determined first power metric.

15. The apparatus of claim 14, wherein the computing task is destined for the first computing node but is rerouted to the third computing node in response to the determined first power metric.

16. At least one storage medium having instructions stored thereon for causing a system to:

determine a first power metric corresponding to a group of computing nodes that includes first and second computing nodes; and distribute a computing task to a third computing node, and not the first or second computing nodes, in response to the determined first power metric;

wherein (a) the first power metric is specific to the group of computing nodes and is not specific to either of the first and second computing nodes; and (b) the first power metric is based on both (b)(i) a power metric specific to the first computing node but not the second computing node, and (b)(ii) an additional power metric specific to the second computing node but not the first computing node.

17. The at least one storage medium of claim 16, wherein the first power metric corresponds to one of temperature, voltage, current, executed instruction count, memory accesses, write counts, read counts, quality of service (QOS), cache misses, data transfer rate, error rate, service response time, signal-to-noise ratio, and frequency response.

18. The at least one storage medium of claim 16, wherein distributing the computing task to the third computing node, and not the first or second computing nodes, includes load balancing computing tasks between the first, second, and third computing nodes in response to the determined first power metric.

19. The at least one storage medium of claim 16, wherein the first and second computing nodes are included in a computer cluster that does not include the third computing node.

20. The at least one storage medium of claim 16, wherein the first power metric includes temperature based on a temperature corresponding to the first computing node and another temperature corresponding to the second computing node.

* * * * *